Sept. 6, 1932.  J. H. WILLIAMS  1,875,537

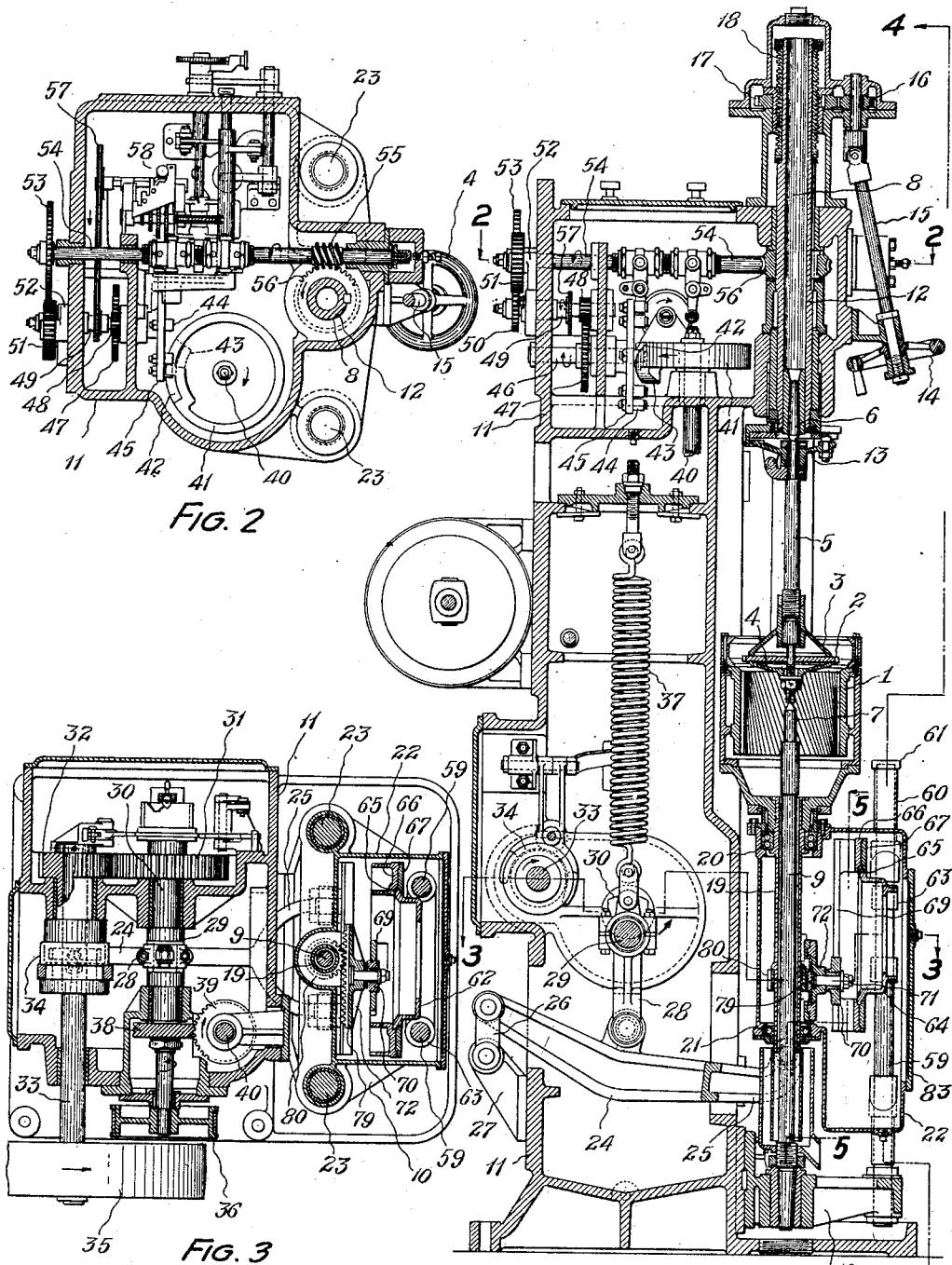

MOTION TRANSMITTING DEVICE

Filed April 21, 1931  3 Sheets-Sheet 2

INVENTOR:
James H. Williams
BY Evans & McCoy
ATTORNEYS

Sept. 6, 1932.   J. H. WILLIAMS   1,875,537
MOTION TRANSMITTING DEVICE
Filed April 21, 1931    3 Sheets-Sheet 3

INVENTOR:
James H. Williams
BY Evans & McCoy
ATTORNEYS.

Patented Sept. 6, 1932

1,875,537

UNITED STATES PATENT OFFICE

JAMES HOWARD WILLIAMS, OF PROVIDENCE, RHODE ISLAND, ASSIGNOR TO DETROIT TRUST COMPANY, OF DETROIT, MICHIGAN, A CORPORATION OF MICHIGAN

MOTION TRANSMITTING DEVICE

Application filed April 21, 1931. Serial No. 531,692.

The present invention relates to a motion transmitting device for obtaining simultaneous, relative, rectilinear and rotational movements between a tool and the work upon which it operates and for maintaining a predetermined ratio between their speeds of relative linear movement and their speeds of relative angular movement.

In various machines, particularly those for cutting, correcting or finishing the teeth of gears, the work and tool have simultaneous, relative, reciprocating and oscillating movements and it is necessary, in order to maintain correct interengaging relationship between the work, in this case the teeth of a gear being cut or finished, and the tool, which may be a cutting or abrading element acting on the teeth, to accurately maintain a predetermined ratio between the speeds of relative rotational movement and the speeds of relative linear movement during the simultaneous relative reciprocating and oscillating movements. The correlated rotational and rectilinear movements above referred to are essential in machines in which the tool is caused to automatically follow the contour of gear tooth faces either along involutes or helices thereof. In machines such as above referred to, where the tool and the work are maintained in correct engagement while they have relative rotational and rectilinear movements, the ratio between the rates of rectilinear and rotational movement is determined in each case by the particular gear which is to be cut or finished by the machine and when it is desired to set up the machine for operation on a gear having a different form, a different speed ratio suitable for the gear to be acted upon must be provided.

Various forms of motion transmitting devices such as gear trains, cams, tapes, helical guides or master gears and racks have been commonly employed in gear cutting or finishing machines to obtain the required correlation of rotational and rectilinear movements. However, devices such as above mentioned, are capable of maintaining only a single predetermined ratio between the speed of angular and rectilinear motion, and it is necessary whenever a different form of gear is to be operated upon to remove the motion transmitting device and replace it with another capable of maintaining the desired speed ratio. Where a single machine is required to operate upon gears which differ in size, helix angle and other characteristics, it is necessary to have on hand a large number of rather expensive replacement parts and considerable time is lost in adjusting the machine for different jobs.

The present invention has for its object to provide a motion transmitting device for correlating linear and rotational movements which is adjustable in such a manner as to obtain any desired ratio between the speeds of angular and linear movements within relatively wide limits.

A further object is to provide a motion transmitting device controlled by a single rotatably mounted member which is accurately graduated to indicate the angular adjustments thereof and which serves to maintain a fixed ratio between the speeds of relative linear and angular movements of the tool and work which is a function of the angle of adjustment of the controlling member.

With the above and other objects in view, the invention may be said to comprise the motion transmitting device as illustrated in the accompanying drawings, hereinafter described and particularly set forth in the appended claims, together with such variations and modifications thereof as will be apparent to one skilled in the art to which the invention appertains.

Reference should be had to the accompanying drawings forming a part of this specification, in which:

Fig. 1 is a vertical cross section of a gear lapping machine to which the invention is applied, the section being taken on the line indicated at 1—1 of Fig. 4;

Fig. 2 is a section taken on the line indicated at 2—2 in Fig. 1;

Fig. 3 is a section taken on the line indicated at 3—3 in Fig. 1;

Figure 4:
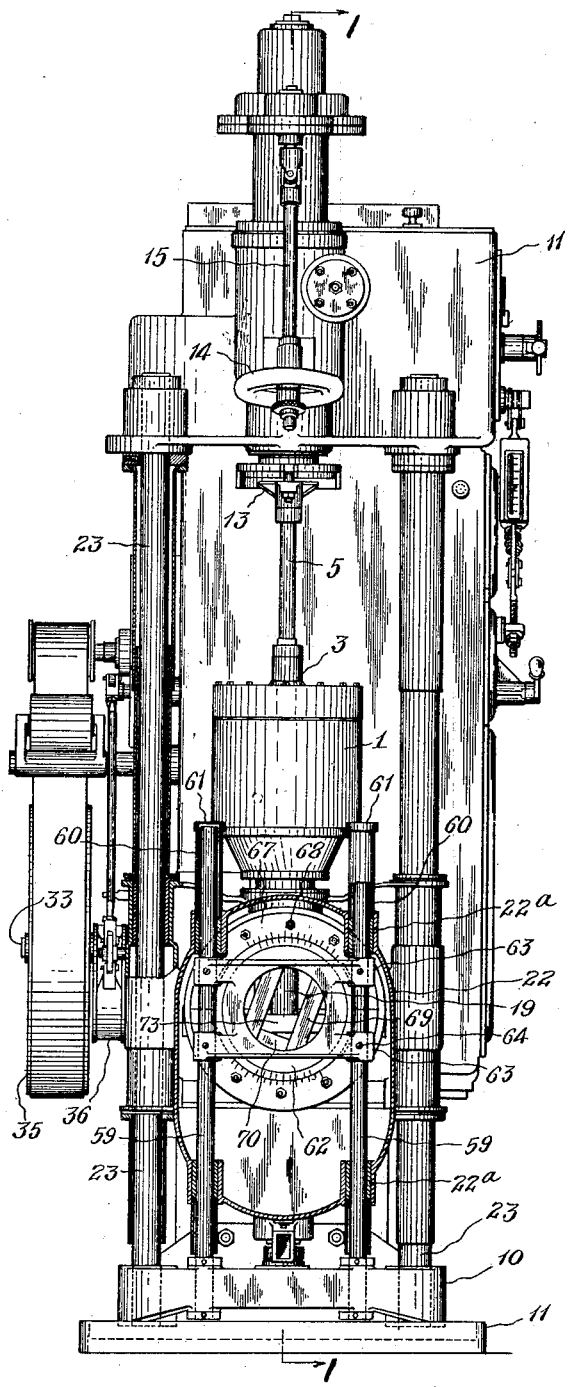
Fig. 4 is a front elevation of the machine partly in section as indicated by the line 4—4 in Fig. 1.
Figure 5:
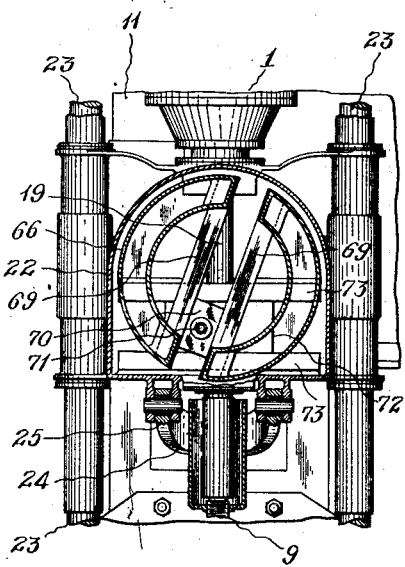
Fig. 5 is a vertical section taken on the line indicated at 5—5 in Fig. 1.
Figure 9:
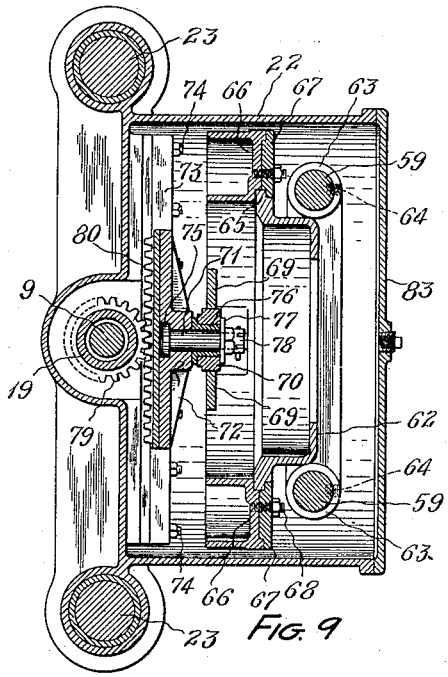
Fig. 9 is a section taken on the line indicated at 9—9 in Fig. 6.

The device of the present invention is applicable generally to machines in which a work holder and tool are required to have co-related relative, reciprocating and oscillating movements in which a predetermined ratio is maintained between the linear and angular speeds, and is herein illustrated as applied to a gear lapping machine of the type disclosed in the patent to Copeland et al No. 1,683,868, granted September 11, 1928. The device of the present invention is employed in machines of the type referred to for imparting oscillatory movements to the reciprocating lap carrying spindle, and for maintaining a predetermined ratio at all times between the speed of linear movement of the spindle and the speed of angular movement thereof, to maintain an invariable engagement between lap tooth faces and gear tooth faces during axial reciprocation of the lap, the lap and gear having the form of complemental internal and external helical gears.

As shown in Fig. 1 of the drawings, the machine is provided with a lap 1 which has the form of an elongated internal gear of a form complemental to that of a gear 2 to be finished. The gear 2 is positioned in axial alignment with the lap 1 and is adapted to telescopically engage with the lap 1 during relative axial reciprocation of the gear and lap. A stream of liquid carrying fine abrasive particles is caused to flow over the gear and through the lap so that abrasive particles are caused to enter between opposed faces of the teeth of the gear and lap so that the tooth faces of the gear which press against tooth faces of the lap during the reciprocation are abraded, and slight discrepancies in the contour of the lap and gear tooth faces are worn down until the gear tooth faces are engaged by the lap tooth faces throughout substantially their entire area. This lapping operation serves to eliminate slight errors in the teeth of the gears especially those which are introduced in the hardening heat treatment to which the gears are subjected after they are cut.

The gear 2 is rigidly held by means of clamping plates 3 and 4 on an arbor 5 which is clamped between upper and lower centers 6 and 7 at the lower and upper ends, respectively, of upper and lower clamping spindles 8 and 9. The lower spindle 9 is rigidly supported at its lower end in a bracket 10 fixed to the frame 11 of the machine, and the spindle 8 is mounted within a sleeve 12 which is slidably mounted in the upper portion of the frame 11. The arbor 5 is fixed to the lower end of the sleeve 12 by means of a suitable chuck 13 and the sleeve 12 may be adjusted vertically to exert an axial clamping thrust on the arbor 5 by means of a hand wheel 14 which is connected by means of a shaft 15 with a pinion 16 which meshes with a gear nut 17 which has threaded engagement with a threaded section 18 of the sleeve 12. The section 18 is attached to the sleeve 12 by suitable means which holds the sleeve 12 against axial movement with respect to the section 18 but which permits the sleeve 12 to turn within the threaded sleeve 18 which is held against rotation in the frame 11. Rotation of the nut 17 causes the sleeve 12 and spindle 8 to be raised or lowered to clamp or release the arbor 5 which is rigidly held against endwise movement during operation of the machine.

The lap 1 is carried by the upper end of a tubular spindle 19 which is concentrically mounted with respect to the lower fixed spindle 9 and through which the spindle 9 extends. The spindle 19 is rotatably supported in ball bearings 20 and 21 in a housing 22 which is slidably mounted on the frame 11 for vertical movement. The housing 22 is held against turning movement and is guided vertically by means of guide posts 23 positioned at opposite sides of the spindle 19 and rigidly secured to the frame 11.

In the operation of the machine the lap 1, spindle 19 and housing 22 are reciprocated bodily as a unit to cause the lap 1 to act upon the gear 2 which is in telescopic engagement with the lap during reciprocation of the lap. Vertical reciprocation is imparted to the housing 22, tubular spindle 19 and lap 1 by means of an actuating lever 24 which has a forked forward end 25 pivotally attached to the bottom of the housing 22 on opposite sides of the spindle 19. The lever 24 is pivoted at its rear end to the upper end of the short link 26 which is pivoted at its lower end to a bracket 27, fixed to the rear side of the frame 11. The lever 24 is oscillated vertically by means of an actuating link 28 which is suspended from a crank arm 29 on a crankshaft 30 and pivoted at its lower end to the lever 24 intermediate the ends thereof. As the crankshaft 30 is rotated the lever 24 is oscillated vertically and its forward end is raised and lowered causing the housing 22 attached thereto to reciprocate vertically. During oscillation of the lever 24, the short link 26 rocks about its pivot to permit the forward end of the lever which is attached to the housing to move vertically in a straight line. The crankshaft 30 has fixed thereto a gear 31 which meshes with a gear 32 which is rotatably mounted on a counter shaft 33 and which is adapted to be connected to the shaft 33 for rotation therewith by means of a suitable clutch 34. The shaft 33 has a suitable driving pulley 35 fixed thereto which may be driven from any suitable source of power. The crankshaft 30 may also be provided with a suitable brake 36 which may be operated to stop the machine in the desired position after the clutch 34 is released, and the crankshaft may also be provided with a suitable load equalizing spring 37 which acts to counterbalance the weight of the housing, lap and sleeve whose weight is imposed upon the outer end of the lever 24, the spring 37 being stretched during the downward movement of the lever 24 and acting to assist in the elevation of the housing and lap during the upward movement of the lever 24.

Means may be provided for automatically indexing the gear 2 with respect to the lap 1 at predetermined intervals and at the ends of strokes of the lap when the gear and lap are out of engagement causing each tooth of the gear to be acted upon successively by different teeth of the lap.

The drive for the indexing mechanism is through a spiral gear 38 fixed to the crankshaft 30 and a spiral gear 39 on a vertical shaft 40 to the upper end of which is attached an indexing wheel 41. The wheel 41 has a spiral groove 42 across its periphery and a projecting lip 43 on its under side which provides a scoop for engaging successive pins 44 on the face of a wheel 45 and causing them to enter the spiral groove. The pins 44 are at equal radial distances from the axis of the wheel 45 and are equiangularly spaced, the spacing of the pins 44 being such that one pin may closely overlie the top face of the wheel 41 while another is positioned contiguous to the bottom face of said wheel. During each revolution of the index wheel 41 the pin 44 in engagement with the under side of the wheel 41 is engaged by the projecting lip or scoop 43 and is caused to enter the groove 42 and move upwardly until it clears the wheel, each revolution of the wheel 41 serving to turn the wheel 45 through an angle corresponding to the angular spacing of the pins 44 thereon.

The wheel 45 is fixed to a shaft 46 which carries a gear 47 meshing with a gear 48 on a countershaft 49 which has a gear 50 attached to the outer end thereof which meshes with a change gear 51 mounted on an adjustable bracket 52 which drives a gear 53 fixed to a transverse shaft 54 which extends forwardly past the sleeve 12 and which has a worm 55 thereon meshing with a worm gear 56 splined to the sleeve 12. Change gear 51 may have the same number of teeth as the gear being lapped and the other gears in the train connecting the index wheel and the sleeve 12 may be so proportioned that the sleeve 12 and gear 2 attached thereto will be turned through an angle corresponding to the angular spacing of the teeth of the gear 2 upon each revolution of the index wheel, as well understood in the art.

As shown in Fig. 2 of the drawings, shaft 49 may drive a sprocket chain 57 actuating mechanism indicated generally at 58 for automatically stopping the machine after a predetermined number of revolutions. This mechanism, however, does not concern the present invention and is not described in detail.

When the gear to be lapped is in the form of a helical gear the lap must be in the form of an internal helical gear complemental to the gear to be lapped, and in order to permit the gear to pass axially through the lap it is necessary for either the gear or lap to have a turning movement as the gear is moving axially through the lap, and in order to make it possible to accurately control the abrasive action, it is desirable that this turning movement be imparted to the gear or lap independently of the thrust of the interengaging teeth of the gear and lap by a positive actuating mechanism, so that there will be no variation in the relative positions of opposed tooth faces during the reciprocating stroke. In other words, the abrading surfaces of the lap teeth should be constrained by the actuating mechanism to move along the helices of the gear tooth faces, and in order to accomplish this result it is necessary that the actuating mechanism impart to the lap or gear an angular movement at a speed proportional to the speed of relative axial movement between the gear and lap. If, as herein illustrated, the lap be oscillated about its axis during its reciprocation, the rate of turning movement must at all times be at a predetermined ratio to the rate of relative axial movement so that each point on the lap tooth surfaces will trace a helix about the common axis of the gear and lap corresponding to the helices of the gear tooth faces at corresponding distances from the common axis. For instance, if the helix angle of the gear measured on its pitch cylinder is 45 degrees, the angular speed of the lap at any instant measured on the pitch cylinder must be equal to its speed of axial movement relative to the gear. For other helix angles the rate of angular movement measured on the pitch cylinder equals the rate of relative axial movement times the tangent of the helix angle, the rate of angular movement being zero for spur gears, which have a zero helix angle, and gradually increasing for gears and laps of progressively greater helix angles.

Various relatively simple mechanical devices have been employed for imparting angular movements proportional to the linear movement of a reciprocating element, either to the reciprocating element itself or to a cooperating element of the machine, such as interposed trains of gearing, helical guides, cams, tapes and the like. Such devices are in general capable of maintaining only one predetermined ratio between the rate of linear and angular movement and are employed in the form of detachably mounted interchangeable parts which must be replaced in setting up the machine for operation on a gear different from gears previously operated on.

Variations in helix angles, pressure angles, diameters and other controlling characteristics of gears are infinite in number, and customers often demand gears which differ from common standards with respect to one or more of these characteristics. This may make it necessary for the gear manufacturer to make special controlling parts to enable his machines to produce the gears required.

The present invention provides a motion transmitting device which is capable of minute adjustments in order to obtain any desired ratio between linear and angular movements which may be required so that the machine may operate upon any gear within the capacity of the machine without interchanging any of the parts of the motion transmitting mechanism.

As illustrated herein, the motion transmitting mechanism is contained within the housing 22 and acts to impart to the lap carrying spindle 19 an angular movement proportional to the rate of linear movement thereof. As shown in Figs. 1, 3 and 4, a pair of laterally spaced vertical posts 59 are attached to the bracket 10 adjacent its outer end and extend upwardly through the housing 22, which is provided with bushings 22ª slidably engaging the posts 59. The upper ends of the guide posts 59 are enclosed in sleeves 60 attached to the top of the housing 22 and the upper end of these sleeves are closed by caps 61. The sleeves 60 and caps 61 provide air chambers above the upper ends of the posts 59 into which air will pass from the interior of the housing 22 through the restricted space between the posts 59 and sleeve 60 during the upward movement so that an air cushion is provided which assists the spring 37 in equalizing the load on the crank shaft during reciprocation of the housing 22 and the lap spindle carried thereby.

The supporting posts 59 provide a fixed support for a supporting drum 62 which may be in the form of a casting having integral bearing brackets 63 which are slidably received on the posts 59 and which may be held in desired position of vertical adjustment on the posts by means of set screws 64. The posts 59 are positioned forwardly of the spindle 19 and the supporting drum 62 which is disposed centrally with respect to the housing and tubular spindle 19, is positioned between the supporting posts 59 and the spindle 19. At its inner end the drum 62 has an outwardly projecting circular flange 65 upon which a supporting annulus 66 may be mounted for angular adjustment about a horizontal axis, the annulus 66 being clamped upon the shouldered periphery of the flange 65 by means of a flat clamping ring 67 which is secured to the rear face of the annulus 66 by means of bolts 68 to clamp the annulus 66 in adjusted position on the flange 65. The annulus 66 has a guideway extending diametrically across the inner face thereof and disposed in a vertical plane which is formed by parallel guide bars 69 rigidly attached to the face of the annulus. A slide 70 is received between the pair of parallel guide bars 69 and this slide is pivotally mounted upon a short horizontal shaft 71 which is affixed at its inner end to a slide 72 which is guided for horizontal movement between guide bars 73 attached to the inner face of the rear wall of the housing 22 by means of bolts 74. The short shaft 71 has a head 75 at its inner end which engages in a recess on the inner side of the slide 72 and, forwardly of the slide 72, the shaft 71 carries a bushing 76 which is clamped against the rear face of the slide 72 by a washer 77 and a nut 78 on the forward end of the shaft 71. The bushing 76 fits in the central opening of the slide 70 which is held between the inner ends of the bushing 76 and the washer 77 with sufficient play to permit the slide 70 to turn freely on the bushing 76. It will be apparent that the slide 72 which is held between the horizontal guides 73 is constrained to move vertically with the housing 22 and is free to move horizontally in the guide 73 during such vertical movement.

By adjusting the supporting annulus 66 angularly the bars 69 forming a guideway for the slide 70 may be disposed at an angle to the vertical and, when the annulus is so adjusted it will be apparent that slide 72 must move horizontally during the vertical movement of the housing. It will further be apparent that the rate of horizontal movement of the slide 72 will always be proportional to the rate of vertical movement of the housing, the measure of the rate of horizontal movement being the rate of vertical movement times the tangent of the angle of the fixed guideway with respect to the vertical. The annulus 66 may be adjusted to dispose the guideway on the inner face thereof at any desired angle with respect to the vertical and it will, therefore, be apparent that any desired ratio may be obtained between the rates of the vertical and horizontal movements imparted to the slide 72. The movably connected slides 70 and 72 provide a floating head interposed between the housing and the relatively fixed support within the housing which moves in the direction of movement of the housing and may also move in a lateral direction, the rates of movement of the slides in their guideways being at a fixed ratio to the rate of movement of the housing.

If any of the well known devices for imparting rotation to a rotatable member from a linearly moving slide with a speed of angular movement proportional to the speed of linear movement of the slide be employed in connection with one of the slides of the floating head above described, it is apparent that the ratio between the rate of angular movement of the rotatable member and the rate of linear movement of the housing may be varied in fine graduations by adjusting the angularity of the fixed guideway.

In the machine herein illustrated the slide 72 is mounted to travel at right angles to the spindle 19 and is employed to transmit a rotary movement to the spindle 19. Any suitable motion transmitting means capable of converting uniform rectilinear motion into uniform rotary motion may be interposed between the slide 72 and the tubular spindle 19 such as a rack bar 79 attached to the inner face of the slide 72 and a pinion 80 fixed to the tubular spindle 19.

Figure 7:
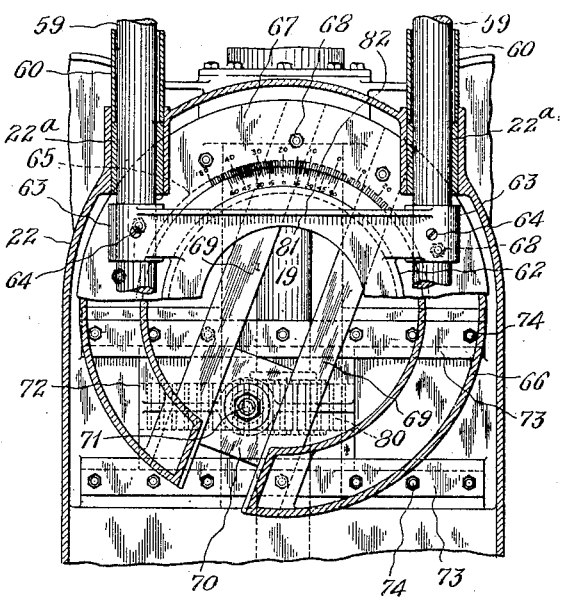
Fig. 7 is a vertical section taken in the plane indicated by the line 8—8 in Fig. 6 but showing the actuating guide disposed at an angle to the vertical.
Figure 6:
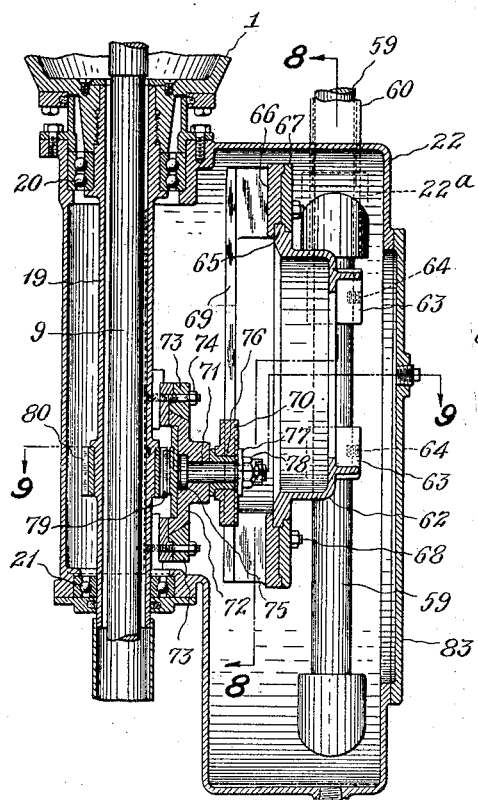
Fig. 6 is a vertical section through the motion transmitting device for oscillating the reciprocating lap with a speed of angular movement proportional to the speed of linear movement, the section being taken on the line indicated at 6—6 in Fig. 8, showing the actuating guide set in vertical position.
Figure 8:
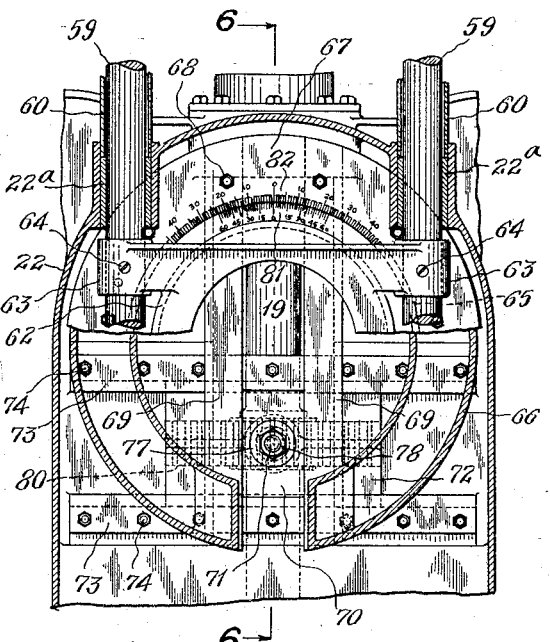
Fig. 8 is a section taken on the line indicated at 8—8 in Fig. 6.

As best shown in Figs. 7 and 8, graduations 81 are provided along the margin of the outer face of the flange 65 and graduations 82 are provided on the outer face of the clamping ring 67 along the inner margin thereof to register with the graduations 81 on the flange. As herein shown, the graduations are in degrees and serve to indicate the angular position of the guideway formed by the guide bars 69. In Fig. 7 of the drawings, the guideway is shown disposed at an angle of twenty degrees to the vertical, and in Fig. 8 the guideway is shown disposed in vertical position. When the guideway is disposed in vertical position no lateral motion is imparted to the floating head during its vertical movement and no angular movement is transmitted to the spindle 19. The adjustable guideway is positioned in vertical position for lapping spur gears since no relative angular movement is required between the gear and lap since the teeth of the gear and lap extend in an axial direction.

It will be apparent that when the linear guide carried by the annulus 66 is disposed at any angle to the vertical, horizontal movement will be imparted to the slide 72 which bears a fixed ratio to the vertical movement of the lap spindle 19 and, since the pitch cylinder of the pinion 80 rolls without slippage on the pitch plane of the rack 79, the angular speed of the spindle 19 measured on the pitch cylinder of the pinion 80 is equal to the horizontal linear speed of the slide 72. During the reciprocating and oscillating movements of the spindle 19 any point moving with the spindle and lying in the pitch cylinder of the pinion 80 will describe a helix about the axis of the spindle, the angle of which is equal to the angle at which the linear guide on the annulus 66 is disposed with respect to the vertical. Points moving with the spindle 19 and disposed within the pitch cylinder of the pinion 80 describe a helix of smaller angle than the helix described by a point on the pitch cylinder of the pinion 80 and points outwardly of the pitch cylinder of the pinion 80 will describe helices of a greater angle. If the pitch diameter of the gear being lapped is equal to the pitch diameter of the pinion 80, the annulus 66 will be adjusted to an angle to the vertical corresponding to the helix angle of the gear. If the gear being lapped is of a different diameter, the angle at which the linear guide on the annulus 66 should be set to produce the required relative rotational movements between the gear and lap is the angle whose tangent is equal to the tangent of the helix angle of the gear times the pitch diameter of the pinion 80 divided by the pitch diameter of the gear. By employing a pinion of a diameter less than the gears to be lapped the amount of angular adjustment of the annulus 66 may be much less than the helix angle of the gear, so that gears of high helix angles or worms may be lapped without disposing the linear guide on the annulus 66 at such high angles to the vertical as to introduce objectionably high frictional resistance to lateral movements of the floating head.

Access may be obtained to the adjustable annulus 66 for fixing the same in various positions of angular adjustment and for adjusting the same vertically on the posts 59 by means of a door 83 in the front wall of the housing 22.

In the operation of the machine, the lap 1 and gear 2 are mounted on the spindle 19 and arbor 5, as shown in Fig. 1, and the annulus 66 is adjusted to bring the linear guideway thereof to the proper angle with respect to the vertical to cause points on the tooth faces of the lap to move in helical paths corresponding to helices of the gear tooth faces, so that an invariable angular relationship is maintained between gear tooth faces and lap tooth faces during reciprocation of the lap. As long as gears having the same lead are being lapped, the adjustment of the annulus 66 need not be changed, but whenever a new lap for finishing a gear with a different lead is substituted for the original lap, the operator adjusts the annulus 66 to the angular position at which relative reciprocating and oscillating movements of the gear and lap are properly correlated.

Helical gears or worms of any helix angle may thus be operated upon without changing any part of the motion transmitting mechanism, the only change in the set-up of the machine, aside from the interchanging of the lap and the indexing change gear, being the angular adjustment of the guideway controlling the lateral movements of the floating head.

Furthermore, it is to be understood that the particular form of apparatus shown and described, and the particular procedure set forth, are presented for purposes of explanation and illustration, and that various modifications of said apparatus and procedure can be made without departing from my invention as defined in the appended claims.

What I claim is:

1. A motion transmitting device comprising a frame having a pair of supports mounted thereon which are provided with opposed guideways, said supports being mounted for relative reciprocation, one of said supports being mounted for adjustment angularly about an axis perpendicular to the plane of its guideway, a floating head interposed between said supports and having portions slidable in said guideways, a member rotatably mounted in one of said supports, and means interposed between said floating head and rotatably mounted member for oscillating the latter.

2. A motion transmitting device comprising a frame having a pair of supports mounted thereon which are provided with opposed guideways, said supports being mounted for relative reciprocation, one of said supports being mounted for adjustment angularly about an axis perpendicular to the plane of its guideway, a floating head interposed between said supports and having portions slidable in said guideways, a spindle rotatably mounted in one of said supports, and a driving connection between said spindle and head for oscillating said spindle with a speed of angular movement proportional to the linear speed of the head along the guideway of the support in which the spindle is mounted.

3. A motion transmitting device comprising a frame having a pair of supports mounted thereon which are provided with opposed guideways, said supports being mounted for relative reciprocation, one of said supports being mounted for adjustment angularly about an axis perpendicular to the plane of its guideway, a floating head interposed between said supports and having portions slidable in said guideways, a spindle rotatably mounted in one of said supports and extending at right angles to the guideway of its support, and means interposed between said head and said spindle for imparting angular movements to the spindle proportional to linear movements of the head along the last mentioned guideway.

4. A motion transmitting device comprising a frame having a pair of supports mounted thereon which are provided with opposed guideways, said supports being mounted for relative reciprocation, one of said supports being mounted for adjustment angularly about an axis perpendicular to the plane of its guideway, a floating head interposed between said supports and having portions slidable in said guideways, a spindle rotatably mounted in one of said supports and extending at right angles to the guideway of its support, a rack carried by said floating head, and a pinion on said spindle meshing with said rack.

5. A motion transmitting device comprising a frame having a pair of supports mounted thereon which are provided with opposed guideways disposed in parallel planes, said supports being mounted for relative reciprocation parallel to the planes of said guideways, one of said supports being mounted for adjustment angularly about an axis perpendicular to the planes of said guideways, a floating head interposed between said supports and comprising a pair of slides fitting in said guideways and connected together for relative rotation about an axis perpendicular to the planes of the guideways, a rotatably mounted member carried by one of said supports, and means interposed between the rotatably mounted member and the slide on the same support for oscillating said rotatably mounted member with a speed of angular movement proportional the speed of the actuating slide along its guideway.

6. A motion transmitting device comprising a frame having a support mounted for reciprocation thereon, a spindle rotatably mounted in said support, a guideway on said support extending at right angles to the spindle, a second support on said said frame having a guideway opposed to the first mentioned guideway and disposed in a plane parallel thereto, said second support being angularly adjustable about an axis perpendicular to its guideway, a floating head interposed between said supports and having portions slidable in said guideways, and a driving connection between said head and spindle for oscillating said spindle as said head is reciprocated in the guideway on the spindle support.

7. A motion transmitting device comprising a frame having a support mounted for reciprocation thereon, said support having a linear guideway, a second support having a linear guideway thereon, said second support being angularly adjustable about an axis perpendicular to the plane of its guideway to adjust said guideway to different angles with respect to the guideway of the first support, a floating head comprising interconnected relatively movable slides mounted in said guideways, a spindle, and a driving connection between one of said slides and said spindle for oscillating the spindle as the slide is reciprocated in its guideway.

8. A motion transmitting device comprising a frame having a support in the form of a housing mounted for linear reciprocation on the frame, a spindle journalled in said housing, guides for said housing carried by the frame and extending into the housing, a guideway carried by the housing and extending at right angles to said spindle, a second support attached to said guides within the housing, said second support having a guideway opposed to the first mentioned guideway and being adjustable about an axis perpendicular to the plane of its guideway, a floating head interposed between and supported by said guideways, said head having pivotally connected slides mounted in said guideways, and a driving connection between the slide in the first mentioned guideway and said spindle for oscillating the spindle as the slide is reciprocated.

9. A motion transmitting device comprising a supporting frame, a support mounted for linear reciprocation on the frame, a spindle carried by said support and having its axis disposed parallel to the line of movement of said support, a guideway on said support extending transversely of said spindle, a slide mounted to travel in said guideway, movement imparting means for moving said slide in its guideway at a speed proportional to the speed of linear movement of the support, means for adjusting said movement imparting means to vary the ratio between the linear speeds of the support and slide, and means interposed between the slide and spindle for imparting to the spindle turning movements at speeds proportional to the speeds of movement of the slide.

10. A motion transmitting device comprising a supporting frame, a support mounted for linear reciprocation on the frame, a spindle carried by said support, a guideway on said support extending transversely of the direction of movement of the support, a slide mounted to travel in said guideway, an annulus mounted on the frame independently of said support and having a guideway opposed to the guideway on said support, said annulus being adjustable about its axis to vary the angle of its guideway, a member attached to said slide and engaging in the last mentioned guideway, and driving means interposed beteween said slide and said spindle to turn the spindle at a rate proportional to the linear speed of said slide.

In testimony whereof I affix my signature.

JAMES HOWARD WILLIAMS.